United States Patent [19]

Harnsberger

[11] 4,102,398

[45] Jul. 25, 1978

[54] METHOD OF FORMING GRAVEL PACKS

[75] Inventor: Bobby G. Harnsberger, Houston, Tex.

[73] Assignee: Texaco Inc., New York, N.Y.

[21] Appl. No.: 776,678

[22] Filed: Mar. 11, 1977

[51] Int. Cl.² .............................................. E21B 43/02
[52] U.S. Cl. .................................................... 166/276
[58] Field of Search ................ 166/276, 278, 280, 292

[56] References Cited

U.S. PATENT DOCUMENTS

| | | | |
|---|---|---|---|
| 3,376,930 | 4/1968 | Kiel et al. | 166/280 |
| 3,393,737 | 7/1968 | Richardson | 166/292 |
| 3,438,441 | 4/1969 | Richardson | 166/292 |
| 3,498,380 | 3/1970 | Sparlin | 166/278 |
| 3,500,926 | 3/1970 | Richardson | 166/292 |
| 3,500,927 | 3/1970 | Simpson | 166/292 |
| 3,709,299 | 1/1973 | Suman, Jr. et al. | 166/278 |

*Primary Examiner*—Stephen J. Novosad
*Assistant Examiner*—George A. Suchfield
*Attorney, Agent, or Firm*—Carl G. Ries; Thomas H. Whaley; Walter D. Hunter

[57] ABSTRACT

A method of gravel packing a well comprising injecting into the well bore opposite a production zone a slurry of metal-coated sand to form a deposit of the coated sand against the wall of the well bore. The in-place, metal-coated sand is then electrolessly plated with a metal such as nickel to form a consolidated permeable, coated sand pack thereby minimizing migration of sand and other granular materials into the well bore from the production zone.

12 Claims, No Drawings

METHOD OF FORMING GRAVEL PACKS

BACKGROUND OF THE INVENTION

1. Field of the Invention

This invention relates to an improved method of forming a gravel pack wherein particulate material, such as sand, electrolessly-coated with copper, is injected as a slurry into the well to form a deposit against the wall of the well bore and subsequently electrolessly plating the in-place, coated sand with, for example, nickel thus forming a consolidated, permeable, metal-coated sand pack which is effective in preventing the flow of fine particles from the formation into the well.

2. Prior Art and Background

Recovery of formation fluid such as petroleum from a subterranean formation is frequently difficult when the subterranean formation is comprised of one or more incompetent or unconsolidated sand layers of zones. The sand particles in the incompetent or unconsolidated sand zone move or migrate into the well bore during recovery of formation fluids from that zone, or sand particles move away from the well during injection of secondary or tertiary recovery fluids into the formation. In the instance of recovering the fluid from the formation, the movement of sand into the well bore can cause the well to cease production of fluids therefrom. Also, small sand particles can plug small openings and porous masses formed around the well bore for the purpose of restraining the flow of sand, such as screens or slotted liners which are frequently placed in wells for this purpose. Not only can fluid production be reduced or even stopped altogether, if sand particles flow through the well to the surface, considerable mechanical problems can result from passage of abrasive sand particles through pumps and other mechanical devices.

Many techniques have been described in the prior art for preventing or decreasing the flow of sand into well in a course of petroleum production, including the use of sand screens, filters, perforated or slotted liners, etc. around the well. These prior art attempts have been successful in some limited instances, but have not always been entirely satisfactory for a number of reasons. Mechanical devices usually restrain only the larger particle sand and are not completely effective for the purpose of restraining or preventing the flow of fine particles from the formation into the well and ultimately to the surface. Furthermore, the devices interfere with various types of completions and work over operations.

Recently, there have been introduced into the market place by numerous oil field companies, chemical compositions which bond the sand grains together with a resinous plastic material to form a permeable mass which effectively restrains the flow of sand particles from the formation. These methods involve injecting into a sand pack around a well bore, a polymerizable, resinous material, which is later caused to polymerize so as to consolidate formation sand or sand packed around the well for that purpose, to form the desired permeable barrier. Numerous difficulties have been encountered in commercial application and use of this technique, including the difficulty of achieving the even polymerization of the resinous material to the degree necessary to consolidate the sand particles while still maintaining the necessary permeability so that petroleum or other fluid may pass therethrough. Furthermore, the resinous materials are expensive. Recently, many tertiary recovery techniques involving the injection of steam or other fluids into the formation for the purpose of mobilizing viscous petroleum, and this has imposed a still greater burden on sand consolidation techniques, and has particularly caused problems with the plastic consolidation techniques which are sensitive to the high temperature, high pH aqueous fluids frequently employed in such processes. The resinous materials are frequently dissolved or degraded by contact with the hot alkaline fluids used intetiary recovery processes.

Serious problems have been encountered in attempting to use conventional sand packs in conjunction with tertiary recovery techniques involving steam injection. Where the high temperature steam or hot water under high flow rates contacts sand packs it has been found that such packs are quickly eroded away or dissolved and must therefore be replaced at frequent intervals.

There is need in the art therefore for a sand pack which when employed, for example, in wells utilized in steam or hot water flooding operations, will have a long operating life.

SUMMARY OF THE INVENTION

The pack of solid particulate matter of this invention may be formed in a variety of ways. Generally a minor amount of the formation adjacent that section of the well to be treated is removed by washing with hot water as in the case of a tar sand formation or other suitable fluid or by under-reaming to form a small cavity in the immediate vicinity of the well bore. After a suitable amount of material has been removed the tubing string and/or other well hardware is placed in the well following which the sand or gravel is introduced into the well bore opposite the permeable formation.

In one suitable method (Method A) of introducing the sand or gravel into the well a slurry of the particulate material in water, oil, or some other suitable fluid is formed and pumped into the wellbore. Generally the thus-formed slurry is pumped down the annulus between the well tubing and the well casing, through the bottom of the annulus and then through perforations such as slots or other openings in the closed-end tubing which extends below the casing to a location opposite the permeable zone. The perforations in the tubing are selected so that the particulate material is filtered from the slurry as it enters the tubing from which the carrier liquid is removed to the surface by pumping. Simultaneously the slurry is forced into the formation and the particulate material contained is filtered out against the formation face. The granular or particulate materials thus removed from the slurry form the pack consisting essentially of particulate material tightly packed together which in a final step is essentially metal plated to form a consolidated permeable pack.

In another procedure (Method B) the casing which extends through the permeable production zone is perforated near the top and again near the bottom of the producing zone after which a tubing string equipped with a back-off connection so that the tubing can be pulled after packing and having a screen or perforated liner attached to it at the end is run and the screen or liner is positioned opposite the lower set of perforations. Then a packer is set between the two sets of perforations. Slurry containing the particulate matter is pumped down the annulus between the casing and the tubing out of the upper set of perforations, through the previously formed cavity outside the casing opposite the perforations then back through the lower set of perforations and finally through the screen. The particulate material is filtered out against the lower set of perforations and against the formation face from the portion of the slurry which is simultaneously forced into the formation. The thus-formed sand pack is then electrolessly metal-plated to form a consolidate, permeable pack.

In another procedure (Method C) for forming a pack which is especially useful in connection with the production of heavy hydrocarbons from, for example, tar sands in which a heavy oil or tar is the matrix and sand or other solids are suspended in the oil, the casing is set through the production zone and perforated at the top of and at the bottom following which tubing is run into the casing to a depth so that a packer may be set between the sets of perforation and the tail pipe extended below the lowest perforations. After the packer is set steam or hot water is forced down the casing, out of the upper perforations, back through the lower perforations and finally out of the tubing. Circulation is continued until a cavity of the desired size is washed or melted out of the formation. In the next step the tubing and packer is pulled and tubing equipped with a back-off connection so that the tubing can be pulled after packing and having a packed-off screen at the end thereof is run and set with the screen opposite the lower perforations and a packer between the two sets of perforations. A slurry of the particulate packing material in water/oil or some other suitable fluid is pumped down the annulus between the casing and tubing, out through the upper casing perforations and then back through the lower casing perforations and against the screen wall which filters out the particulate material while the carrying fluid passes through the screen and flows back to the surface via the tubing string. As the particulate material is filtered out it gradually builds up in the cavity previously formed and when the amount of filtered out material is sufficient to cover the lower perforations the introduction of the slurry is stopped. Simultaneously during the injection phase, the slurry is forced out into the formation and particulate material thus is filtered out against the formation face and also contributes to the filling of the previously formed cavity. In a final step, the thus formed sand pack is electrolessly metal plated to form a consolidated, permeable pack.

In the process of this invention the mesh size of the metal-coated particulate material, such as copper-coated sand injected into the well bore will vary in size from about 20 to about 100 mesh and preferably will be from about 20 to about 80 mesh size. Usually the amount of metal-coated sand present in the slurry will be from about 2 to about 10 pounds or more per gallon of the carrier fluid and preferably this amount will be from about 4 to about 6 pounds per gallon.

A wide variety of carrier fluids can be employed in preparing the slurry of the metal-coated sand employed in this invention including fresh water, brine, hydrocarbon oils including crude oil, kerosene, etc. Since it is required that the carrier fluid have sufficient viscosity to maintain the copper-coated sand in a suspension it may be desirable to add a gelling agent. With oil-base fluids soaps, such as sodium palmitate, may be utilized and with water base fluids guar gum is a highly satisfactory gelling agent.

The metal-coated sand particles employed in this invention can be prepared by a variety of methods. For example, copper-coated sand particles can be formed by first electrolessly copper plating clean sand grains employing methods well known in the art after which the thickness of the copper coating can be increased, if desired, by conventional electolytic methods. The preparation of copper-coated sand grains is also described in U.S. Pat. Nos. 3,026,938 and 3,376,930 which are incorporated herein in their entirety.

In another embodiment of this invention copper-coated sand grains prepared as described above are coated directly on the copper surface thereof with cobalt or nickel either by electroless plating methods or by conventional electrolytic plating methods after which the particles coated first with copper and then with nickel are injected into the well bore in a slurry and the metal-coated in place grains are finally electrolessly plated with sufficient cobalt or nickel to form a consolidated permeable sand pack against the wall of the well bore.

The electroless plating of the in-place, metal-coated sand grains to from a consolidated, permeable sand pack positioned against the wall of the well bore opposite the producing formation can be conveniently accomplished using solutions and methods well known in the art.

In carrying out the electroless plating operation of the present invention, it is sometimes preferable, prior to treating the in-place, metal-coated sand grains with the electroless metal depositing solutions, that the in-place sand grains be pretreated or flushed to displace the formation hydrocarbon fluid and connate water away from the vicinity of the sand pack and adjacent formation by injecting thereinto a suitable preflushing liquid which can be, for example, an inert hydrocarbon oil such as diesel oil, distillate or a solvent such as isopropyl alcohol.

In the electroless plating of the metal-coated sand grains it is usually not necessary to do more than treat the clean metal surfaces with an acid wash such as hydrochloric acid to remove any oxide coating which may be present. However, in order to obtain a uniform, adherent deposition of, for example, nickel or cobalt on the surfaces of the metal-coated sand grains during the electroless plating step, it is preferred to contact the metal-coated sand grains with an acidic aqueous solution containing an activating agent such as colloidal palladium for the purpose of catalyzing or activating the metal surface thereof. Finally, the thus treated metal-coated sand grains are treated with an aqueous solution containing a metal plating compound and a reducing agent. In carrying out the electroless plating operation, the plating solution may be circulated through the pack until expended where two sets of casing perforations with an intermediate packer are present in the well. The injection rates of the fluids utilized in the electroless plating process of this invention can be varied widely depending on the bottom hole temperature of the well. In some instances it may be desirable to inject heated fluids into the formation or well bore heaters may be employed to heat the fluids introduced.

When the metal-coated sand grains of the pack are first treated by contacting the mass a liquid capable of activating the particles of the pack and thereafter contacting the activated metal-coated sand grains with a metal deposition solution containing chemicals comprising polyvalent metal ions and a reducing agent, the metal is reduced to the free metal and deposited on the surface of the particles forming the pack. In forming a consolidated sand pack it is necessary to bind the metal-encased particles together and the amount of fluid should be only sufficient to coat the particles and to bond them together without destroying the permeability of the pack or the sand packs.

When properly performed, this procedure results not only in forming a thin coating of cobalt or nickel metal around the metal-coated sand grains forming the pack but also results in the forming of a continuous, permeable metal matrix. The resulting consolidated permeable pack is not affected by the injection of high temperature fluids such as hot water, steam or super-heated steam. The amount of either the activator or metal plating solution utilized in practicing the electroless plating step of this invention will depend on the size of the particular sand pack being treated.

In accomplishing the first step of the electroless plating operation of subject invention, the in-place, metal-coated sand grains are treated with the activator formulation. This can be done in a variety of ways. For example, in Method C the activator solution can be injected down the annulus between the casing and the tubing out through the upper set of casing perforations after which it contacts the in-place metal-coated sand grains, the excess solution, if any, passes through the lower set of perforations and through the screen following which it is removed from the well via the tubing string. Acidic solutions of palladium chloride and/or stannous chloride can be used. The activator solution should also contain a reducing agent, such as hydrazine, sodium hypophosphite, a lower aldehyde, e.g., formaldehyde, etc.

Preferably, the activator liquids are aqueous solutions acidified with acetic, formic or hydrochloric acid, etc. Other activator fluids which can be employed are aqueous solutions containing gold, ruthenium, rhodium or platinum, etc., together with a reducing agent such as hydrazine, and with or without a protective colloid such as gum arabic, tragacanth gum, gelatin, etc. The function of the reducing agent is to reduce the metal salt in the activator solution to the free metal which may be in colloidal form. Other activator liquids commonly used for electroless metal plating of non-metallic objects may similarly be used.

After the activator fluid has been injected into and has adequately contacted the sand pack to be plated, it must be displaced by an inert spacer fluid such as water, brine or a very dilute activator solution (i.e., one of the previously mentioned activator solutions diluted by a factor of 15 or more), etc. For example, an aqueous sodium chloride solution containing in the range of from 5 to 20 weight percent sodium chloride may be injected so as to displace the activator solution away from the sand pack. Under certain formation conditions it may be possible and/or desirable to force air through the sand pack to accomplish the same purpose.

The metal-containing plating solution can be acidic, having a pH of from 2 to 6, and a pH range of from 4 to 6 is especially preferable. Alkaline metal plating solutions may also be used, where desirable.

Metal plating compositions suitable for use in the electroless plating step of this invention include, for example, nickel or cobalt chlorides and/or the corresponding sulfates. Reducing compositions useful in such electroless plating compositions include reagents such as hypophosphorous acid, hypophosphites, e.g., sodium hypophosphite, or alkaline solutions of formate, molybdenate and/or hydroxy carboxylates. The metal-containing compounds and the reducing agents may be present in concentrations ranging from about 1 to about 40 percent by weight each. A variety of suitable activator solutions as well as electroless metal plating solutions have been described in U.S. Pat. Nos. 3,393,737; 3,500,926; 3,500,927; 3,586,524; 3,438,411; etc., which are incorporated herein by reference. Wetting agents may be employed in the above-described solutions in order to promote the wetting of the surfaces to be stabilized.

The present invention avoids any undesirable delays in the inauguration of a supplemental recovery technique involving the injection of an aqueous fluid, since very little reaction time is involved in forming the desired metal matrix and metal encasement of the sand particles. Injection of fluid, even heated aqueous fluids, can be initiated immediately after completion of the plating process.

The following example illustrates one embodiment of this invention and is to be considered not limitative:

EXAMPLE I

The casing of an oil well in a southern Oklahoma field with a long history of sand problems is perforated near the top of the producing zone (3942-3975 feet) and again near the bottom (3987-4012 feet). Loose sand, etc., is then cleaned out of the well bore. A tubing string equipped with a back-off connection so that the tubing can be pulled after packing and having a screen about 20 feet in length and having a diameter about 2 inches less than the casing diameter attached to it at the end is run into the hole. The screen is positioned opposite the lower set of perforations following which a packer is set between the two sets of perforations. Next, a slurry of about 4.5 pounds per gallon of copper-coated sand in kerosene is injected into the well via the annulus between the tubing and the casing, forced out of the upper set of perforations and back through the lower set of perforations and finally through the screen to form the desired sand pack. The mesh size of the copper-coated sand grains is about 20 to about 40. Injection of the slurry is continued until a sharp increase in surface pressure of about 850 psi occurs and at that time 9800 pounds of copper-coated sand along with about 52 barrels of carrier liquid have been pumped into the well.

Preliminary to the plating step any oil present on the metal-coated sand grains is removed by injection a preflush consisting of 10 barrels of isopropyl alcohol followed by 15 barrels of water into the well via the annulus, through the upper set of perforations and out through the lower perforations and screen and finally, out of the well via the tubing. In the next step, 12 barrels of an activator solution having the following composition is injected into the well to contact the in-place pack in the same manner as with the preflush.

TABLE 1
COMPOSITION OF ACTIVATOR SOLUTION

| | Quantity per barrel of solution[1] |
|---|---|
| Water, gallons | 40.7 |
| Gum arabic, gms.[2] | 20.6 |
| Hydrazine hydrate (85%),cc | [3]256 |
| Palladium chloride solution, cc.[4] | 636 |
| NiSO$_4$ 6H$_2$O (Omit when buffers are used. | |
| 90% formic acid or glacial acetic | |
| (as needed for pH=4.4) cc. | ~160-320 |
| Buffers: | |
| Formic acid (90%) cc | 640 |
| Sodium Formate, pounds | 7 |
| Or acetic acid (glacial) liters | 6.4 |

TABLE 1-continued

COMPOSITION OF ACTIVATOR SOLUTION

| | Quantity per barrel of solution[1] |
|---|---|
| Sodium acetate, pounds | 10.5 |

Note:
Chemicals must be added to the water in order listed with complete mixing and dissolving before adding the next chemical.
[1]Contains 10.2 grams $PdCl_2$/bbl. of activator solution.
[2]Requires about 15 minutes to dissolve.
[3]Or 400 cc. of 35% hydrazine.
[4]Contains 1.6 gms. $PdCl_2$, 10 cc. conc. HCl, 90 cc. distilled or deionized water/100 cc. $PdCl_2$ solution.

Following treatment of the pack with the activator solution about 25 barrels of water are injected into the well and passed through the pack after which the copper-coated sand grains are electrolessly nickel-plated by injecting into the well in the same way as employed with the preflush about 40 barrels of an electroless nickel plating solution containing the following:

(a) 1074 gallons filtered drinking water
(b) 1880 pounds $Ni SO_4 6H_2O$
(c) 1680 pounds $NaH_2PO_2H_2O$
(d) 1260 pounds Na acetate $3H_2O$
(e) 430 pounds of Na succinate $6H_2O$
(f) 336 gallons glacial acetic acid
(g) A solution of 117 pounds $FeSO_4$ was added thereafter.

In a final injection step, the plating solution is displaced through the metal-plated sand pack with 5 barrels of 5% sodium chloride solution. The thus-formed nickel-coated consolidated, permeable pack exhibits substantial compressive strength.

What is claimed is:

1. A method of forming a pack of solid particulate material in a well bore penetrating a permeable formation which comprises injecting into the well bore opposite the said permeable formation a slurry of from about 2 to about 10 pounds per gallon of sand having a size of about 20 to about 100 mesh per gallon of carrier liquid to create a permeable pack of said sand against the formation face and wherein in a final step the said pack is electrolessly metal plated to form a consolidated permeable pack thereby minimizing migration of sand and other granular material into the well bore from the said permeable formation, the said sand being copper coated and having an outer coating of a metal selected from the group consisting of cobalt and nickel.

2. The method of claim 1 wherein the said carrier liquid is brine.

3. The method of claim 1 wherein the said carrier liquid is water.

4. The method of claim 1 wherein the said carrier liquid is brine containing a thickening agent.

5. The method of claim 1 wherein the said carrier is water containing a thickening agent.

6. The method of claim 1 wherein the said carrier liquid is water containing guar gum.

7. The method of claim 1 wherein the said carrier liquid is crude oil.

8. The method of claim 1 wherein the said carrier liquid is kerosene.

9. The method of claim 1 wherein the said copper-coated sand has an outer cobalt coating.

10. The method of claim 1 wherein the said copper coated sand has an outer nickel coating.

11. The method of claim 1 wherein in the final step the said pack is electrolessly nickel-plated to form the consolidated permeable pack.

12. The method of claim 1 wherein in the final step the said pack is electrolessly cobalt-plated to form the consolidated, permeable pack.

* * * * *